United States Patent
Xydis

(10) Patent No.: US 6,212,448 B1
(45) Date of Patent: Apr. 3, 2001

(54) RF ONLY GUIDANCE SYSTEM

(75) Inventor: Thomas G. Xydis, 1141 Chestunt Rd., Ann Arbor, MI (US) 48104

(73) Assignees: Paul G. Angott, Bloomfield; Thomas G. Xydis, Ann Arbor, both of MI (US)

( * ) Notice: Subject to any disclaimer, the term of this patent is extended or adjusted under 35 U.S.C. 154(b) by 0 days.

(21) Appl. No.: 09/191,770

(22) Filed: Nov. 13, 1998

(51) Int. Cl.$^7$ .............................. G01C 22/00; G05D 1/00
(52) U.S. Cl. ............................ 701/23; 701/200; 701/22; 701/25; 180/168; 56/10.2 A; 56/10.2 R
(58) Field of Search .................... 701/23, 200, 22, 701/25, 209; 56/10.2 R, 10.2 A; 180/168

(56) References Cited

U.S. PATENT DOCUMENTS

| | | | |
|---|---|---|---|
| 4,133,404 | * | 1/1979 | Griffin .................. 180/79.1 |
| 4,229,737 | * | 10/1980 | Heldwein et al. ............ 342/46 |
| 5,666,792 | * | 9/1997 | Mullins ................ 56/10.2 A |
| 5,911,670 | * | 6/1999 | Angott et al. ........... 56/10.2 A |
| 5,974,347 | * | 10/1999 | Nelson ..................... 701/22 |
| 6,009,358 | * | 12/1999 | Angott et al. ............... 701/25 |
| 6,049,745 | * | 4/2000 | Douglas et al. .............. 701/23 |

* cited by examiner

Primary Examiner—William A. Cuchlinski, Jr.
Assistant Examiner—Olga Hernandez
(74) Attorney, Agent, or Firm—Howard & Howard

(57) ABSTRACT

A programmable utility vehicle assembly 10 comprises a carriage 20 for moving over a plot, and a mobile transceiver 30 attached to the carriage 20 for transmitting a signal. The assembly 10 includes a power unit 22 for driving the carriage 20 over the plot, and a steering unit 24 for steering the carriage 20 over the plot. The assembly 10 further includes a plurality of locating stations 40 each having a stationary transceiver 42 for receiving a signal from the mobile transceiver 30 and transmitting a return signal to the mobile transceiver 30. The assembly 10 is characterized by a central processing unit 60 (CPU) on the carriage 20 for preprogramming a desired vehicle path having a counter 62 for counting two way propagation time between the mobile transceiver 30 and said remote locating stations 40 to determine said vehicle location and guide said vehicle along the programmed path.

21 Claims, 4 Drawing Sheets

RF ONLY GUIDANCE SYSTEM

BACKGROUND OF THE INVENTION

1) Technical Field

The subject invention relates to a utility vehicle which is self propelled and is controlled by a central processing unit to follow a predetermined route.

2) Description of the Prior Art

The prior art includes various systems for locating a mobile transceiver using various types of audio and radio frequency (RF) waves. Some of these are disclosed in U.S. Pat. No. to 5,652,593 to Rench, U.S. Pat. No. 4,229,737 to Heldwein, and U.S. Pat. No. 4,703,444 to Storms. U.S. Pat. No. 5,652,593 utilizes audio and RF waves for keeping a vacuum cleaner on a straight path. U.S. Pat. No. 4,229,737 to Heldwein, and U.S. Pat. No. 4,703,444 to Storms utilize RF waives for establishing a location of a mobile transponder.

However, none of the above mentioned prior art provides a method for programming a utility vehicle with a predetermined route utilizing utility RF waves for programming and subsequently guiding the utility vehicle around the predetermined route.

SUMMARY OF THE INVENTION AND ADVANTAGES

A programmable utility vehicle assembly comprises a carriage for moving over a plot, and a mobile transceiver attached to the carriage for transmitting a signal. The assembly includes a power unit for driving the carriage over the plot, and a steering unit for steering the carriage over the plot. The assembly further includes a plurality of locating stations each having a stationary transceiver for receiving a signal from the mobile transceiver and transmitting a return signal to the mobile transceiver. The assembly is characterized by a central processing unit (CPU) on the carriage for preprogramming a desired vehicle path having a counter for counting two way propagation time between the mobile transceiver and the remote locating stations to determine the vehicle location and guide the vehicle along the programmed path.

The invention incorporates a method for programming a vehicle central processing unit (CPU) on a utility vehicle for driving and directing the vehicle over a plot in response to instructions from the CPU. The method comprises the steps of placing a plurality of remote locating stations in spaced positions about a plot, placing a mobile transceiver on a carriage, transmitting a first signal from the mobile transceiver to the locating stations, returning a return signal to the mobile transceiver from the locating stations, and counting the two way propagation time of the first and return signals between the mobile transceiver and the locating stations for determining the utility vehicle location.

Accordingly, the invention provides a utility vehicle with a CPU and a method for easily programming the CPU for repeatedly guiding the utility vehicle to travel along a predetermined path.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
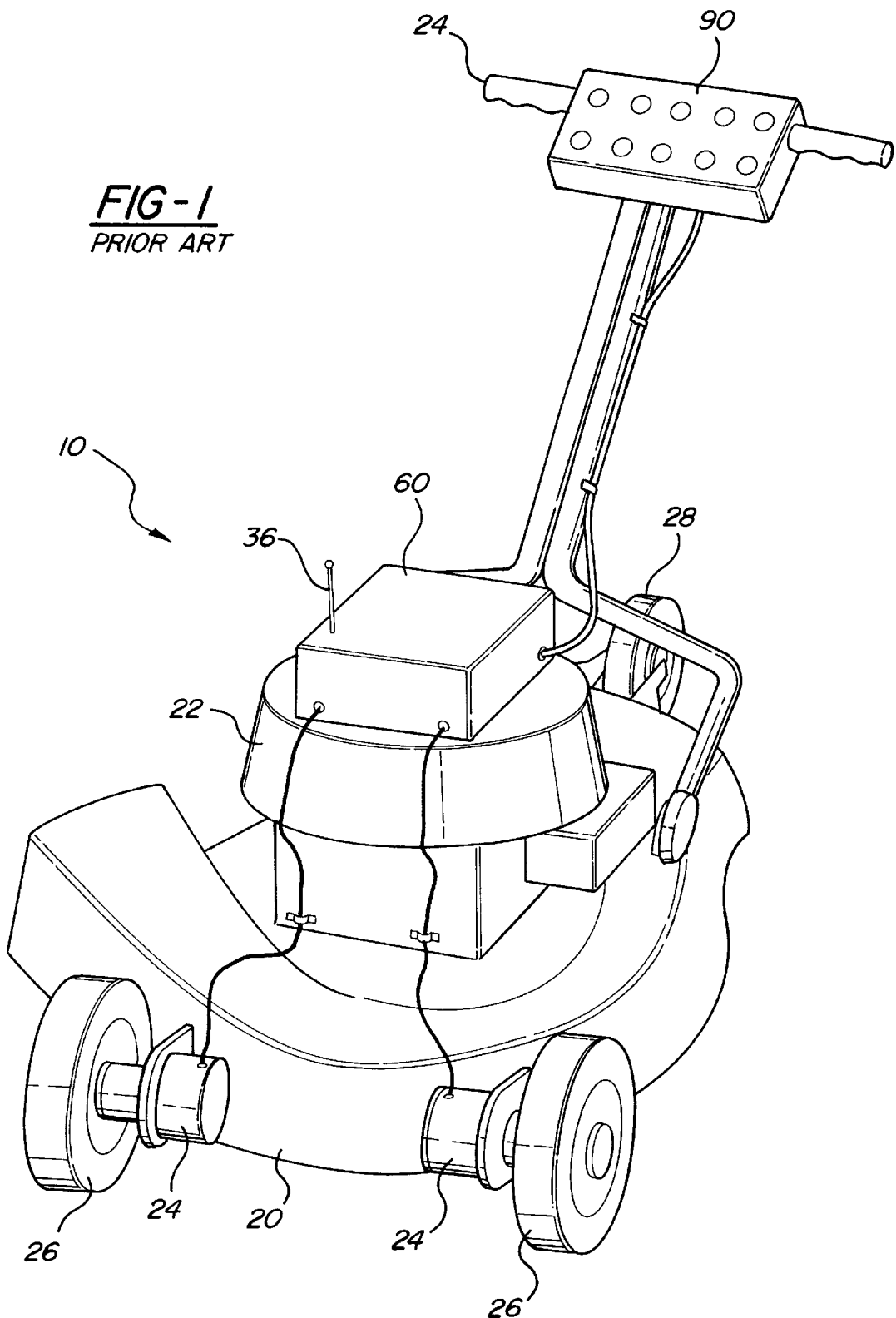
FIG. 1 is a perspective view of the utility vehicle incorporating the subject invention.
Figure 2:
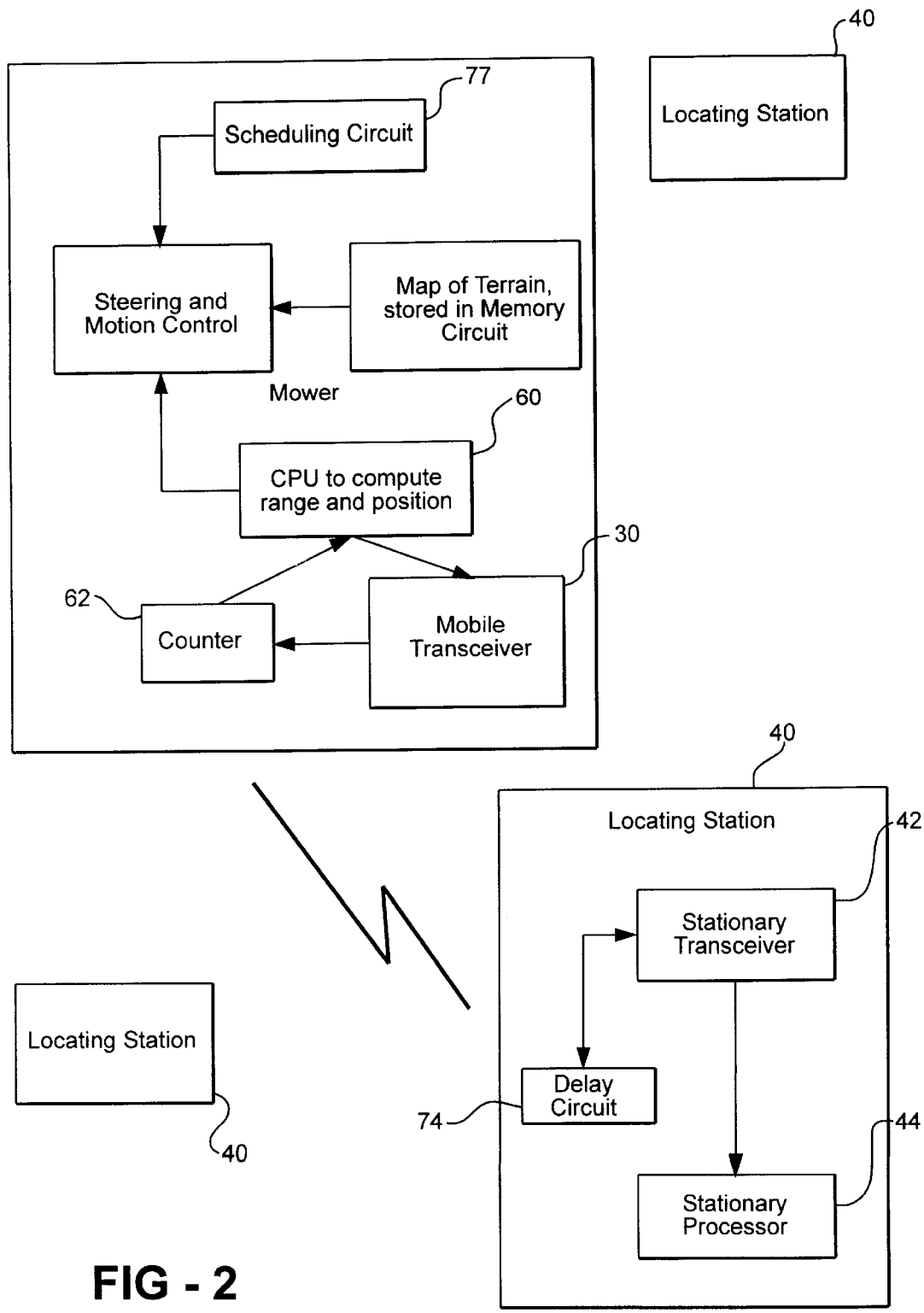
FIG. 2 is a schematic view of the system deployed on a plot of ground.
Figure 3:
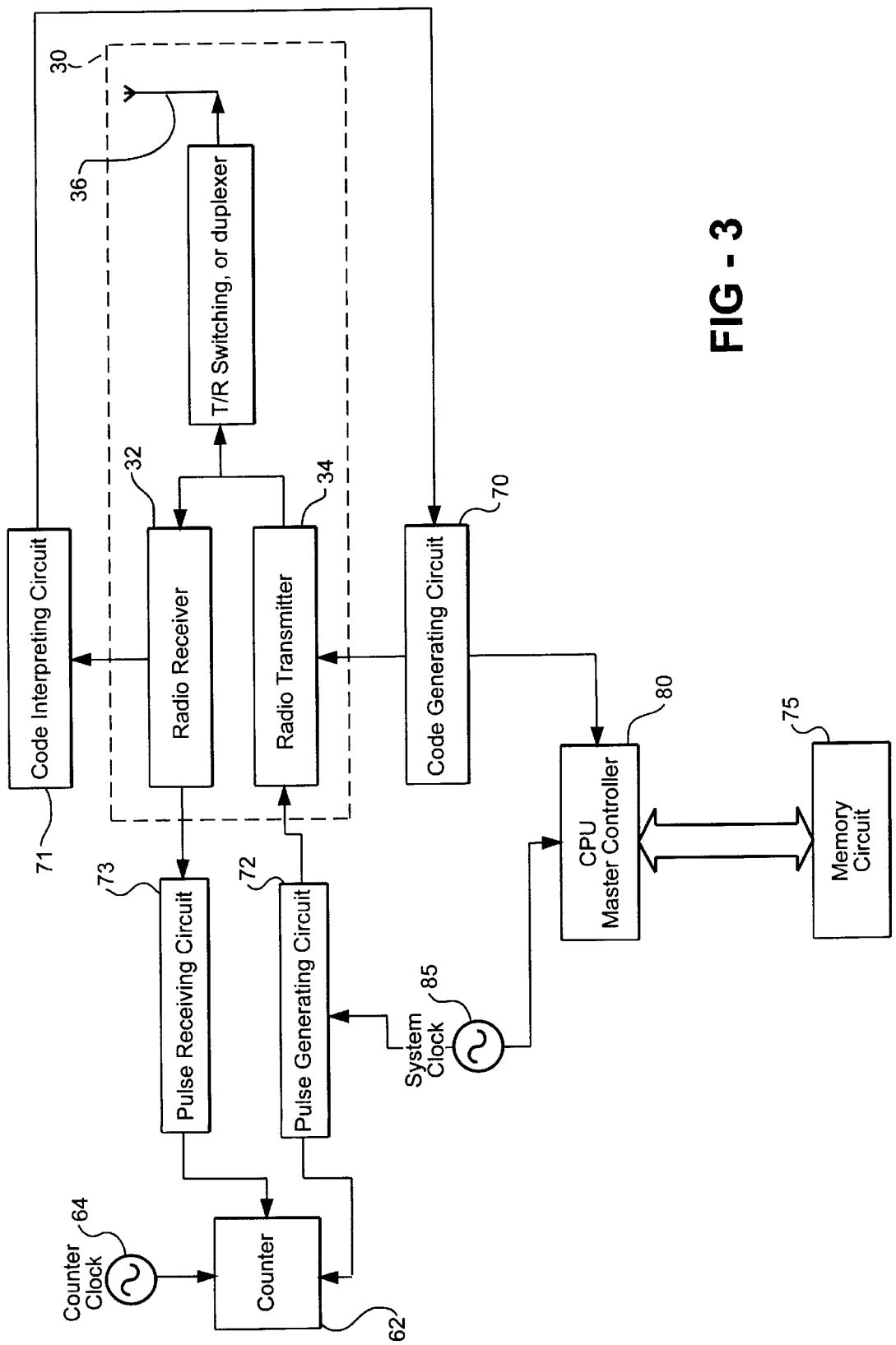
FIG. 3 is a schematic view of the central processing unit (CPU)as deployed on the utility vehicle.
Figure 4:
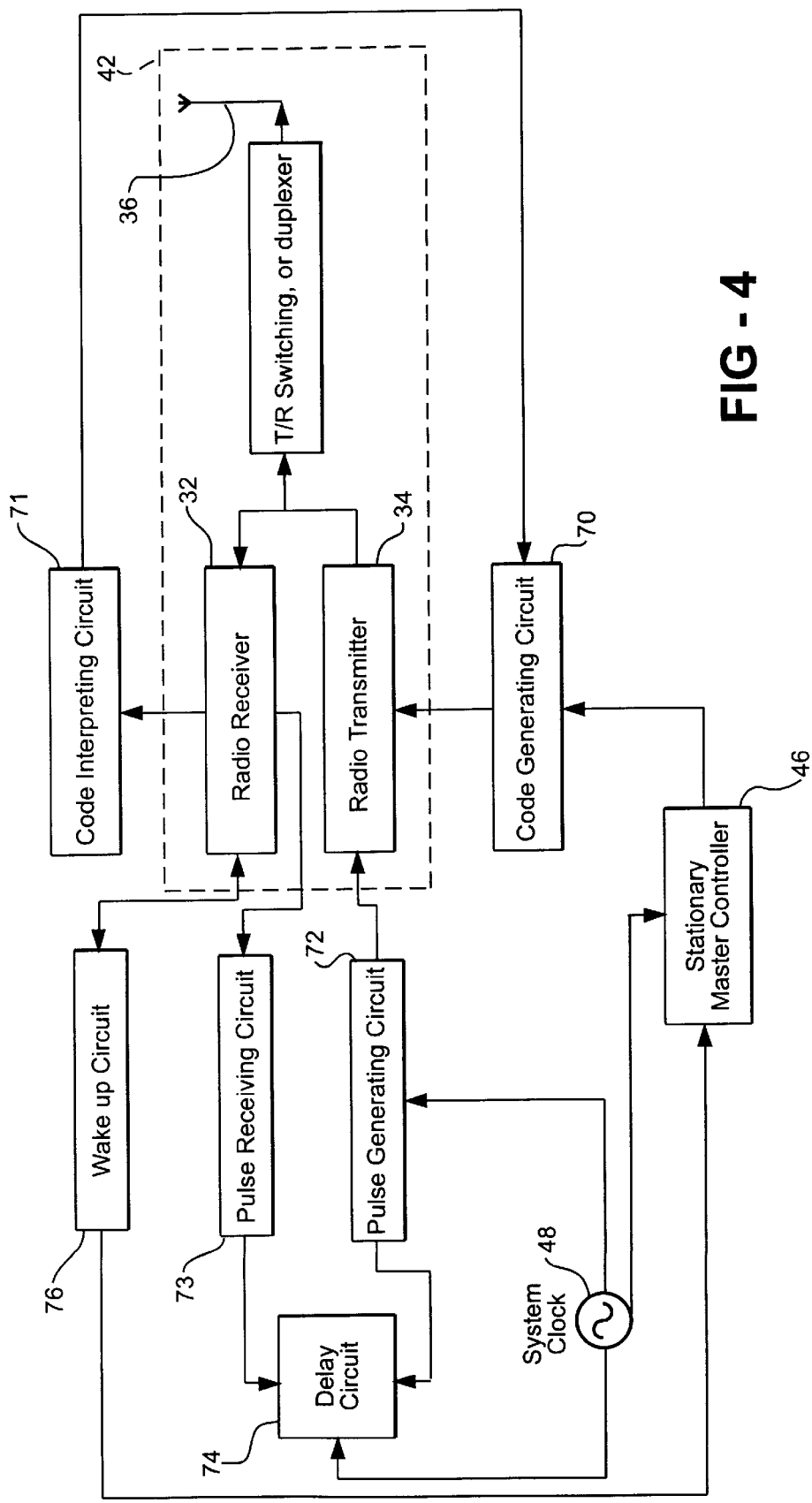
FIG. 4 is a schematic view of the locating station of the subject invention.

Referring to the Figures, wherein like numerals indicate like or corresponding parts throughout the several views, a programmable utility vehicle assembly is generally shown at 10. The assembly 10 includes a carriage 20 for moving over a plot and a mobile transceiver 30 attached to the carriage 20 for transmitting a signal. The mobile transceiver 30 can take the form of a separate radio receiver 32 and a separate radio transmitter 34 each utilizing a single antenna 36 through a transmit/receive (T/R) switching device or a duplexer as is well known in the art. The duplexer would allow the receiver 32 and transmitter 34 to share the same antenna 36 while utilizing different frequencies while the T/R switch would allow the receiver 32 and transmitter 34 to utilize the same frequency.

The assembly 10 further includes a power unit 22 disposed on the carriage 20 for providing power for driving the carriage 20 over the plot, and a steering unit 24 for steering the carriage 20 over the plot. More specifically, the power unit 22 includes electric motors 24 for rotating wheels 26 to propel the carriage 20 around the plot as the caster wheel 28 allows turning.

A plurality of locating stations 40 each having a stationary transceiver 42 for receiving a signal from the mobile transceiver 30 and transmitting a return signal to the mobile transceiver 30 are spread about the plot. Like the mobile transceiver 30, the stationary transceiver 42 can take the form of a separate radio receiver 32 and a separate radio transmitter 34 each utilizing a single antenna 36 through a T/R switching device or a duplexer as is well known in the art. A typical arrangement would include thee locating stations 40 evenly spaced around the plot. However, the distance between the stations relative to one another may vary.

The assembly 10 is characterized by a central processing unit 60 (CPU) on the carriage 20 for preprogramming a desired carriage 20 path. The CPU 60 includes a counter 62 for counting two way propagation time of the signal between the mobile transceiver 30 and the remote locating stations 40 to determine the carriage 20 location and guide the carriage 20 along the programmed path. The counter 62 includes a counter clock 64 contemplated to operate between 2 and 5 GHz, but not to the exclusion of a broader range.

The first signal from the mobile transceiver 30 and the return signal from the remote locating station 40 are further defined as a radio frequency (RF) timing pulse. These two signals will typically be identical. The counter 62 begins counting when the RF timing pulse is emitted from the mobile transceiver 30 and stops counting when the mobile transceiver 30 receives the return RF timing pulse from the locating station 40. By counting the two way propagation time between mobile transceiver 30 and the locating stations 40, the CPU 60 is able to determine the distance between the carriage 20 and each of the locating stations 40. One method for the CPU 60 to calculate distance is by multiplying the count value by the clock period used by the counter 62 and correlating the result with RF wave speed.

The locating stations 40 each include a stationary processor 44. The stationary processor 44 processes the signals received from the mobile transceiver 30 for retransmission to the mobile transceiver 30.

The CPU 60 includes a code generating circuit and a code interpreting circuit 71 for transmitting a coded signal to the locating stations 40 and subsequently receiving a coded signal from the locating stations 40. Corresponding to the CPU 60, the stationary processors 44 each include an individual code interpreting circuit 71 for receiving a coded signal from the mobile transceiver 30, and an individual code generating circuit 70 for transmitting a coded signal to the mobile transceiver 30. For example, an individual coded signal will be transmitted to each locating station 40 in sequential order. Each locating station 40 will subsequently return an individual coded signal to the mobile transceiver 30. In this manner, the CPU 60 can identify each locating station 40 and determine the carriage 20 distance from that station 40. In addition, the code interpreting circuit 71 will convert the coded transmission for processing by the CPU 60. An additional feature of the code generating circuit 70 is the ability to transmit scrambled signals to operate under FCC Spread Spectrum Rules should these rules apply to the RF transmissions.

The stationary processors 44 each include a stationary master controller 46. The master controller 46 signals the code generating circuit 70 to proceed with generating a coded signal for the radio transmitter 34 to transmit.

The CPU 60 includes a pulse generating circuit 72 for transmitting the RF timing pulse to the locating stations 40 and a pulse receiving circuit 73 for receiving the return RF timing pulse from the locating stations 40. In like manner, the stationary processors 44 each include a pulse receiving circuit 73 for receiving the RF timing pulse from the mobile transceiver 30 and a pulse transmitting circuit 72 for transmitting the RF timing pulse to the mobile transceiver 30. In addition, the pulse receiving circuit 73 will perform amplitude compression upon the received pulse. The RF timing pulse is transmitted having a wide ranging amplitude. For the CPU 60 and the stationary processors 44 to process the pulse data from the pulse receiving circuit 73, this wide range of the pulse amplitude must be compressed. This can be performed by performing log amplification, which will reduce the dynamic range of the pulse amplitude from about 10,000:1 to about 7:1. In an alternate embodiment, the RF timing pulse can be replaced by a pseudo random pulse string. This would require that the pulse time of arrival be easily and unambiguously determined, which could be accomplished by transmitting a string of pulses that does not repeat.

Each stationary processor 44 includes a delay circuit 74 for delaying transmission of the return timing pulse. The delay allows the locating stations 40 time to prepare to transmit the return transmission. The stationary processors 44 each include a stationary system clock 48. The stationary system clock 48 transmits timing signals to the delay circuit 74, the pulse generating circuit 72 and the stationary master controller 46.

The CPU 60 includes a memory circuit 75 for storing data points. Each data point includes the timing pulse two way propagation time between the mobile transceiver 30 and the remote locating stations 40 and a direction indicating the carriage 20 direction. The memory circuit 75 stores at least three data points for determining a direction vector for projecting travel. The CPU 60 determines a discrepancy between the actual travel vector and the programmed travel vector for revising the actual travel vector to match the programmed vector. The CPU 60 determines an inability for the carriage 20 to correct the actual travel vector and return to the programmed travel vector and the CPU 60 terminates travel.

The CPU 60 includes a CPU master controller 80 for receiving data from the code circuit and communicating with the memory circuit 75. The CPU master controller 80 coordinates communication within the CPU 60 between the memory circuit 75 and the other signaling circuits. The CPU 60 includes a system clock 85 having a first output for the pulse generating circuit 72 and a second output for the CPU master controller 80. The first output will generally be of a higher speed than that of the second output.

The stationary processors 44 each include a wake-up circuit 76 activated by a first RF signal from the mobile transceiver 30 for preparing the remote locating station 40 for the timing pulse from the mobile transceiver 30 beginning programmed travel around a plot. This allows the locating stations 40 to power down when not in use and power up when the carriage 20 is ready to begin unaccompanied travel around the preprogrammed path.

The CPU 60 includes a scheduling circuit 77 for storing predetermined times in the CPU 60 for the carriage 20 to automatically follow the programmed travel. For example, the scheduling circuit 77 allows the CPU 60 to be programmed to leave a storage area at a desired time to begin unaccompanied travel around the preprogrammed path.

A steering device 90 is attached to the carriage 20 for maneuvering the carriage 20 about the plot for programming the CPU 60. The carriage 20 includes a keypad 90 connected to the CPU 60 for programming the CPU 60.

The invention, therefore, encompasses a method of programming a carriage 20 central processing unit 60 (CPU) on a carriage 20 for driving and directing the carriage 20 over a plot in response to instructions from the CPU 60 and includes placing a plurality of remote locating stations 40 in spaced positions about a plot and placing a mobile transceiver 30 on a carriage 20. The method is further defined by transmitting separate coded timing pulses to said locating stations 40 wherein each locating station 40 includes a code interpreting circuit 71 for receiving and a code generating circuit 70 for retransmitting the separate coded signals to the mobile transceiver 30. The method further comprises counting the two way propagation time of the first and return signals between the mobile transceiver 30 and the locating stations 40 for determining the carriage 20 location. The method includes defining the signals as transmitting a radio frequency (RF) timing pulse.

For example, to program the CPU 60 with a map of the plot the carriage 20 will operate about, the CPU 60 is first activated. Upon activation, the carriage 20 is manually maneuvered about the plot in a pattern desired by the operator. During manual operation, the mobile transceiver 36 transmits separate coded timing pulses to each locating station 40 wherein each locating station 40 includes code circuits 70,71 for receiving and retransmitting the separate coded signals to the mobile transceiver 30. In this manner, the CPU 60 determines data points comprising the two way propagation time for the RF timing pulse between the mobile transceiver 30 and the locating stations 40.

The method is further defined by storing the data points comprising two way propagation time between the mobile transceiver 30 and the locating towers while maneuvering the carriage 20 along a desired path. The CPU 60 determines the distance of the carriage 20 from the locating stations 40 by converting the two way propagation time to distance. The method further includes steering the carriage 20 over the lawn, storing the path in the CPU 60 and repeatedly moving the carriage 20 over the plot in response to the CPU 60 following the stored path. Accordingly, the CPU 60 continuously stores the data points while the carriage 20 is manually maneuvered about the plot to establish the preprogrammed carriage 20 path allowing the carriage 20 to repeat the path unaccompanied by an operator.

The method is further defined by processing the last three data points for projecting a direction vector for the carriage 20. The direction vector is determined by the CPU 60 for projecting the direction the carriage 20 is to proceed. While traveling along the preprogrammed path, the CPU 60 will compare the stored direction vector with the carriage's 20 actual direction vector and continually make corrections to the carriage 20 direction. As explained hereinabove, should the CPU 60 determine the carriage 20 can not be returned to the programmed path the carriage 20 the CPU 60 will terminate travel.

The method further includes delaying the return transmission to the mobile transceiver 30 from the locating stations 40. The delay allows the locating stations 40 time to prepare to transmit the return transmission.

The method is further defined by programming predetermined times into to the CPU 60 for the carriage 20 to automatically follow the programmed path. For example, the CPU 60 can be programmed to leave a storage area and proceed to the beginning point of the programmed path at specified times of the day. When the scheduling circuit activates the mobile transceiver 30 a wake up signal is transmitted to the locating stations 40 to prepare the stations for a timing pulse.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A programmable utility vehicle assembly 10 comprising:
    a carriage 20 for moving over a plot,
    a mobile transceiver 30 attached to said carriage 20 for transmitting a signal,
    a power unit 22 for driving said carriage 20 over the plot,
    a steering unit 24 for steering said carriage 20 over the plot,
    a plurality of locating stations 40 each having a stationary transceiver 42 for receiving a signal from said mobile transceiver 30 and transmitting a return signal to said mobile transceiver 30,
    a central processing unit 60 (CPU) on said carriage 20 for preprogramming a desired carriage 20 path having a counter 62 for counting two way propagation time between said mobile transceiver 30 and said remote locating stations 40 to determine said carriage 20 location and guide said carriage 20 along the programmed path,
    said locating stations 40 each including a stationary processor 44,
    said stationary processors 44 each including an individual code interpreting circuit 71 for receiving a coded signal from said mobile transceiver 30, and an individual code generating circuit 70 for transmitting a coded signal to said mobile transceiver 30,
    said stationary processor 44 including a pulse receiving circuit 73 for receiving a RF timing pulse from said mobile transceiver 30 and a pulse transmitting circuit for transmitting a RF timing pulse to said mobile transceiver 30,
    said stationary processors 44 each including a delay circuit 74 for delaying transmission of said return timing pulse;
    said stationary processors 44 each including a stationary master controller 46.

2. An assembly 10 as set forth in claim 1 wherein said coded signal is further defined as a radio frequency (RF) timing pulse.

3. An assembly 10 as set forth in claim 1 wherein said CPU 60 includes a code generating circuit and a code interpreting circuit 71 for transmitting a coded signal to said locating stations 40 and subsequently receiving coded signals from said locating stations 40.

4. An assembly 10 as set forth in claim 1 wherein said CPU 60 includes a pulse generating circuit 72 for transmitting a RF timing pulse to said locating stations 40 and a pulse receiving circuit 73 for receiving a return RF timing pulse from said locating stations 40.

5. An assembly 10 as set forth in claim 1 wherein said stationary processors 44 each include a system clock 48.

6. An assembly 10 as set forth in claim 1 wherein said counter 62 begins counting when said RF timing pulse is emitted from said mobile transceiver 30 and stops counting when said mobile transceiver 30 receives said return RF timing pulse from said locating station 40.

7. An assembly 10 as set forth in claim 1 wherein said CPU 60 includes a memory circuit 75 for storing data points.

8. An assembly 10 as set forth in claim 1 wherein said stationary processor 44 includes a wake-up circuit 76 activated by a first RF signal for preparing said remote locating station 40 for said timing pulse from said mobile transceiver 30 beginning programmed travel around a plot.

9. A programmable utility vehicle assembly 10 comprising:
    a carriage 20 for moving over a plot,
    a mobile transceiver 30 attached to said carriage 20 for transmitting a signal,
    a power unit 22 for driving said carriage 20 over the plot,
    a steering unit 24 for steering said carriage 20 over the plot,
    a plurality of locating stations 40 each having a stationary transceiver 42 for receiving a signal from said mobile transceiver 30 and transmitting a return signal to said mobile transceiver 30,
    a central processing unit 60 (CPU) on said carriage 20 for preprogramming a desired carriage 20 path having a counter 62 for counting two way propagation time between said mobile transceiver 30 and said remote locating stations 40 to determine said carriage 20 location and guide said carriage 20 along the programmed path,
    said CPU 60 including a memory circuit 75 for storing data points
    each data point including said timing pulse two way propagation time between said mobile transceiver 30 and said remote locating stations 40 and a direct indicating said carriage 20 direction.

10. An assembly 10 as set forth in claim 9 including a steering device 90 attached to said carriage 20 for maneuvering said carriage 20 about a plot for programming said CPU 60.

11. An assembly 5 as set forth in claim 9 wherein said memory circuit 75 stores at least three data points for determining a direction vector for projecting travel.

12. An assembly 5 as set forth in claim 11 wherein said CPU 60 determines a discrepancy between the actual travel vector and said programmed travel vector for revising the actual travel vector to match said programmed vector.

13. An assembly 10 as set forth in claim 12 wherein said CPU 60 determines an inability for said carriage 20 to correct the actual travel vector and return to said programmed travel vector and said CPU 60 terminates travel.

14. A programmable utility vehicle assembly 10 comprising:
    a carriage 20 for moving over a plot,
    a mobile transceiver 30 attached to said carriage 20 for transmitting a signal,
    a power unit 22 for driving said carriage 20 over the plot,
    a steering unit 24 for steering said carriage 20 over the plot,
    a plurality of locating stations 40 each having a stationary transceiver 42 for receiving a signal from said mobile transceiver 30 and transmitting a return signal to said mobile transceiver 30,
    a central processing unit 60 (CPU) on said carriage 20 for preprogramming a desired carriage 20 path having a counter 62 for counting two way propagation time between said mobile transceiver 30 and said remote locating stations 40 to determine said carriage 20 location and guide said carriage 20 along the programmed path,
    said carriage 20 including a keypad 90 connected to said CPU 60 for programming said CPU 60.

15. An assembly 10 as set forth in claim 14 wherein said CPU 60 includes a scheduling circuit 77 for storing predetermined times in the CPU 60 for the carriage 20 to automatically follow the programmed travel.

16. An assembly 10 as set forth in claim 15 wherein said CPU 60 includes a CPU master controller 80 for receiving data from said code circuit and communicating with said memory circuit 75.

17. An assembly 10 as set forth in claim 16 wherein said CPU 60 includes a system clock 85 having a first output for said pulse generating circuit 72 and a second output said master controller 80.

18. A method for programming a vehicle central processing unit 60 (CPU) on a carriage 20 for driving and directing the carriage 20 over a plot in response to instructions from the CPU 60, said method comprising the steps of:

placing a plurality of remote locating stations 40 in spaced positions about a plot, and placing a mobile transceiver 30 on a carriage 20, and transmitting a first signal from the mobile transceiver 30 to the locating stations 40, and returning a return signal to the mobile transceiver 30 from the locating stations 40, and counting the two way propagation time of the first and return signals between the mobile transceiver 30 and the locating stations 40 for determining the carriage 20 location, transmitting a radio frequency timing pulse, transmitting separate coded timing pulses to said locating stations 40 wherein each locating station 40 includes a code interpreting circuit 71 for receiving and a code generating circuit 70 for retransmitting said separate coded signals to said mobile transceiver 30, delaying the return transmission to said mobile transceiver 30 from said locating stations 40, and storing data points comprising two way propagation time between the mobile transceiver 30 and the locating towers while maneuvering the carriage 20 along a desired route.

19. A method as set forth in claim 18 including storing said last three data points for projecting a direction vector for said carriage 20.

20. A method as set forth in claim 19 including steering the carriage 20 over the lawn, storing the route in the CPU 60 and repeatedly moving the carriage 20 over the plot in response to the CPU 60 following the stored route.

21. A method for programming a vehicle central processing unit 60 (CPU) on a carriage 20 for driving and directing the carriage 20 over a plot in response to instructions from the CPU 60, said method comprising the steps of:

placing a plurality of remote locating stations 40 in spaced positions about a plot, placing a mobile transceiver 30 on a carriage 20, transmitting a first signal from the mobile transceiver 30 to the locating stations 40, returning a return signal to the mobile transceiver 30 from the locating stations 40, counting the two way propagation time of the first and return signals between the mobile transceiver 30 and the locating stations 40 for determining the carriage 20 location, setting predetermined times in the CPU 60 for the carriage 20 to automatically follow the programmed path.

* * * * *